United States Patent [19]

Melton

[11] 4,248,371
[45] Feb. 3, 1981

[54] WELDING MACHINE

[76] Inventor: Vernon L. Melton, 1600 W. Main St., Washington, Mo. 63090

[21] Appl. No.: 19,764

[22] Filed: Mar. 12, 1979

[51] Int. Cl.³ .................. B23K 9/225; B23K 37/02
[52] U.S. Cl. ................................ 228/7; 228/32; 228/48; 219/124.32; 219/125.11; 409/162; 409/200; 266/57
[58] Field of Search .............. 228/7, 29, 32, 48; 219/124.32, 124.33, 124.34, 125.1, 125.11, 124.22; 266/54, 57; 409/162, 166, 168, 199, 200; 51/50, 165.89

[56] References Cited

U.S. PATENT DOCUMENTS

| | | | |
|---|---|---|---|
| 1,876,204 | 9/1932 | Christman | 409/162 X |
| 2,927,195 | 3/1960 | Arnaud | 219/124.32 |
| 3,126,472 | 3/1964 | Brems | 219/124.22 |
| 3,132,617 | 5/1964 | Miller et al. | 228/7 |
| 3,358,896 | 12/1967 | Kemp | 228/29 |
| 3,970,232 | 7/1976 | Melton | 228/48 X |

*Primary Examiner*—Kenneth J. Ramsey
*Attorney, Agent, or Firm*—Rogers, Eilers & Howell

[57] ABSTRACT

A welding machine can form continuous welds of three hundred and sixty degrees on workpieces which are rotated through angles of less than three hundred and sixty degrees by moving the welding torch of that welding machine in one direction circumferentially of those workpieces while those workpieces are being rotated in the opposite direction.

26 Claims, 16 Drawing Figures

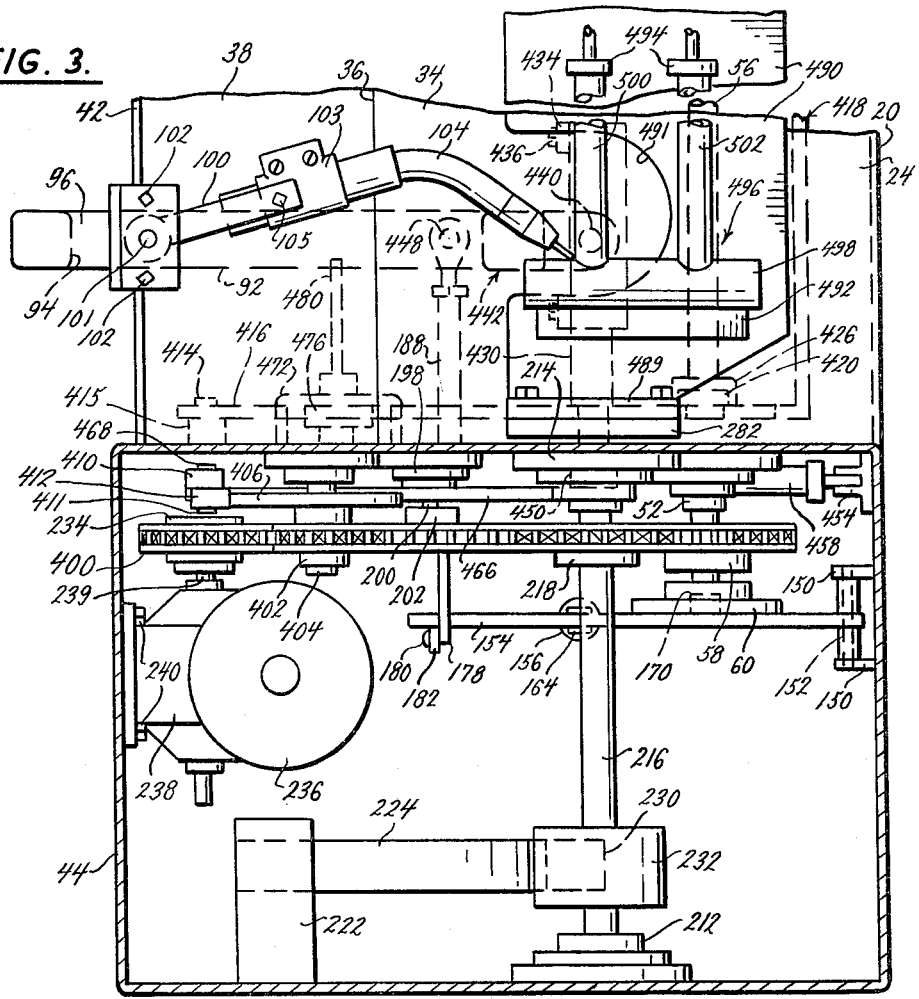
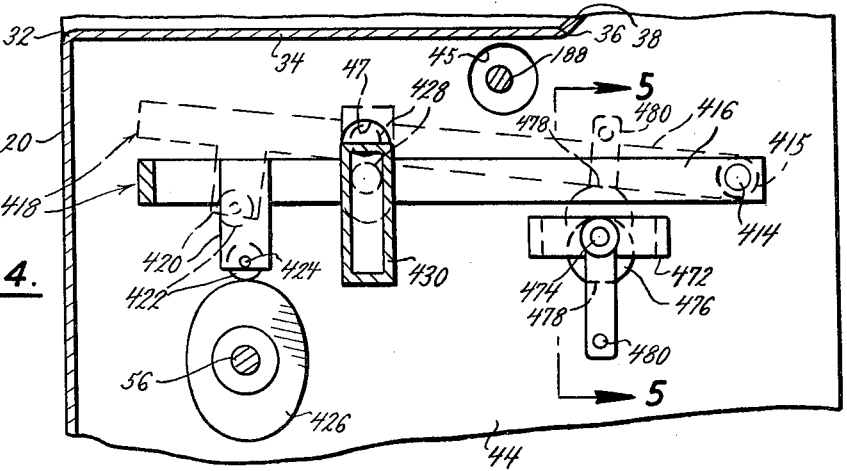

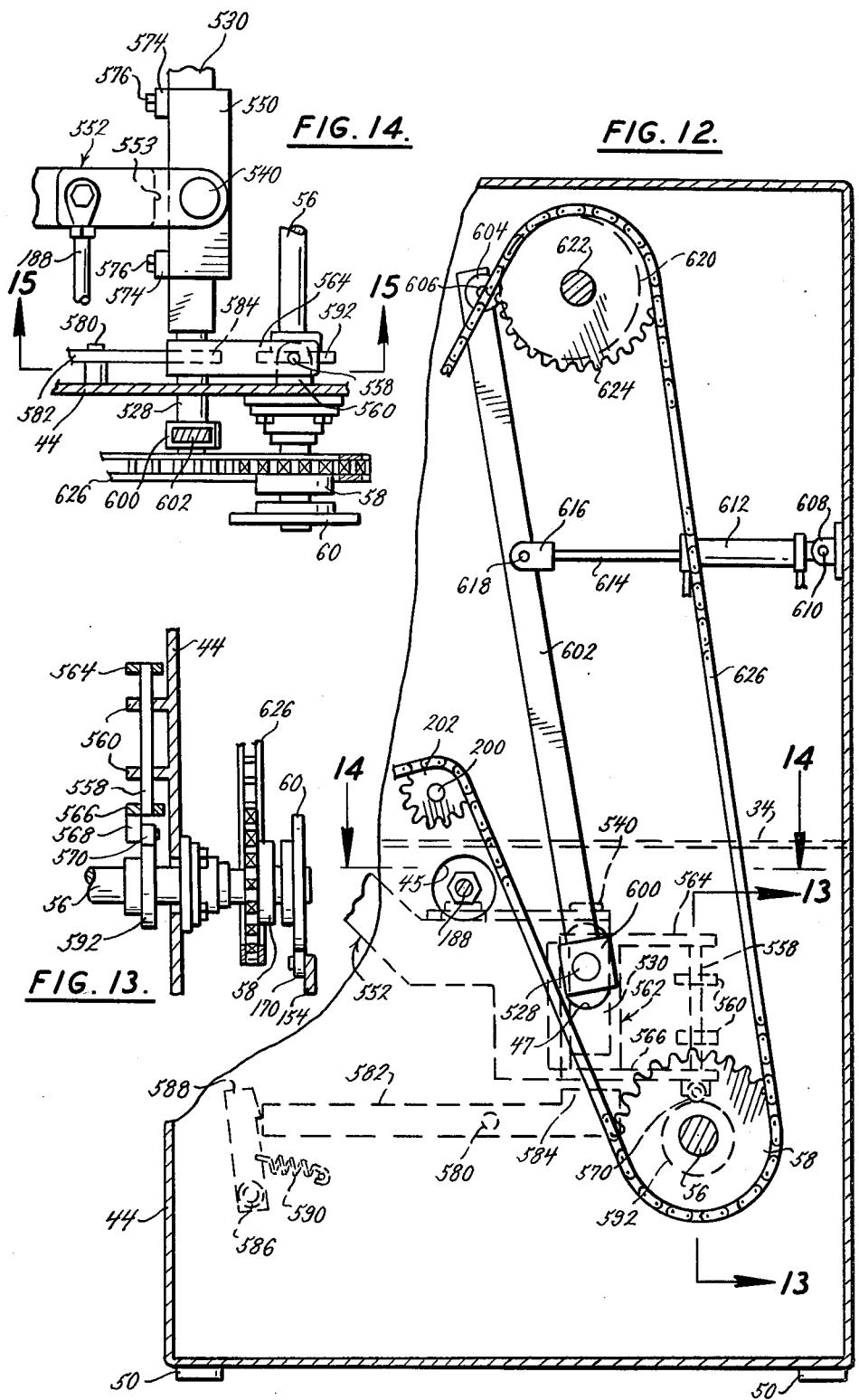

WELDING MACHINE

This invention is an improvement on the welding machine (hereinafter patented welder) which is disclosed and claimed in my U.S. Pat. No. 3,970,232 which was granted on July 20, 1976.

BACKGROUND OF THE INVENTION

When one element of a workpiece is to be welded to another element of that workpiece, it frequently is desirable to form a continuous weld of three hundred and sixty degrees angular extent at the joint between those two elements; and the patented welder can provide such a weld where either of those elements can be rotated through three hundred and sixty degrees. However, some workpieces have forms and configurations which preclude their rotation through three hundred and sixty degrees while those workpieces are mounted in a welding machine. In fact, workpieces are known which can be rotated only through two hundred and seventy degrees while they are mounted in a welding machine. Although it would be possible to provide a three hundred and sixty degree weld at the point between two elements of such a workpiece, by successively mounting that workpiece in two different positions in the patented welder, that weld would not be homogeneous. Also, valuable time would be required to successively mount that workpiece in those two different positions.

SUMMARY OF THE INVENTION

The present invention makes it possible to provide a continuous weld of three hundred and sixty degrees angular extent at the joint between two elements of a workpiece, even though that workpiece can be rotated only two hundred and seventy degrees; and it does so by moving the welding torch of a welding machine in one direction circumferentially of that workpiece while that workpiece is being rotated in the opposite direction. The circumferential travel of the welding torch in the one direction combines with the rotation of the workpiece in the opposite direction to provide relative rotation between that welding torch and that workpiece of three hundred and sixty degrees. It is, therefore, an object of the present invention to provide a welding machine which can provide a continuous weld of three hundred and sixty degrees angular extent on a workpiece which is rotated less than three hundred and sixty degrees by moving the welding torch of a welding machine in one direction circumferentially of that workpiece while that workpiece is being rotated in the opposite direction.

The welding machine of the present invention moves the welding torch thereof tangentially of the axis of rotation of the workpiece while simultaneously moving that welding torch radially of that axis. The rate and extent of that tangential movement can be correlated with the rate and extent of that radial movement to provide a circumferential movement of that welding torch which is the complement of the surface of the workpiece. As a result, the tangential and radial movement of the welding torch enables the resulting composite circumferential movement of that welding torch to closely "track" the joint in the workpiece that is to be welded. It is, therefore, an object of the present invention to simultaneously move the welding torch of a welding machine both tangentially and radially of the axis of rotation of a workpiece to provide a composite circumferential movement for that welding torch which can closely "track" the joint which is to be welded.

Other and further objects and advantages of the present invention should become apparent from an examination of the drawing and accompanying description.

In the drawing and accompanying description a preferred embodiment and an alternate embodiment of the present invention are shown and described but it is to be understood that the drawing and accompanying description are for the purpose for illustration only and do not limit the invention and that the invention will be defined by the appended claims.

BRIEF DESCRIPTION OF THE DRAWING

FIG. 3 is a sectional view, on the scale of FIG. 2, which is taken along the plane indicated by the line 3—3 in FIG. 2, FIG. 4 is another sectional view on the scale of FIG. 2, and it is taken along the plane indicated by the line 4—4 in FIG. 6, FIG. 5 is still another sectional view on the scale of FIG. 2, and it is taken along the plane indicated by the line 5—5 in FIG. 4, FIG. 6 is a further sectional view on the scale of FIG. 2, and it is taken along the plane indicated by the line 6—6 in FIG. 2, FIG. 7 is a still further sectional view on the scale of FIG. 2, and it is taken along the plane indicated by the line 7—7 in FIG. 6, FIG. 12 is a vertical section through an alternate embodiment of welding machine that is made in accordance with the principles and teachings of the present invention, FIG. 13 is a sectional view which is taken along the plane indicated by the line 13—13 in FIG. 12, FIG. 14 is a sectional view which is taken along the plane indicated by the line 14—14 in FIG. 12.

DESCRIPTION OF THE PREFERRED AND ALTERNATE EMBODIMENTS

Figure 1:
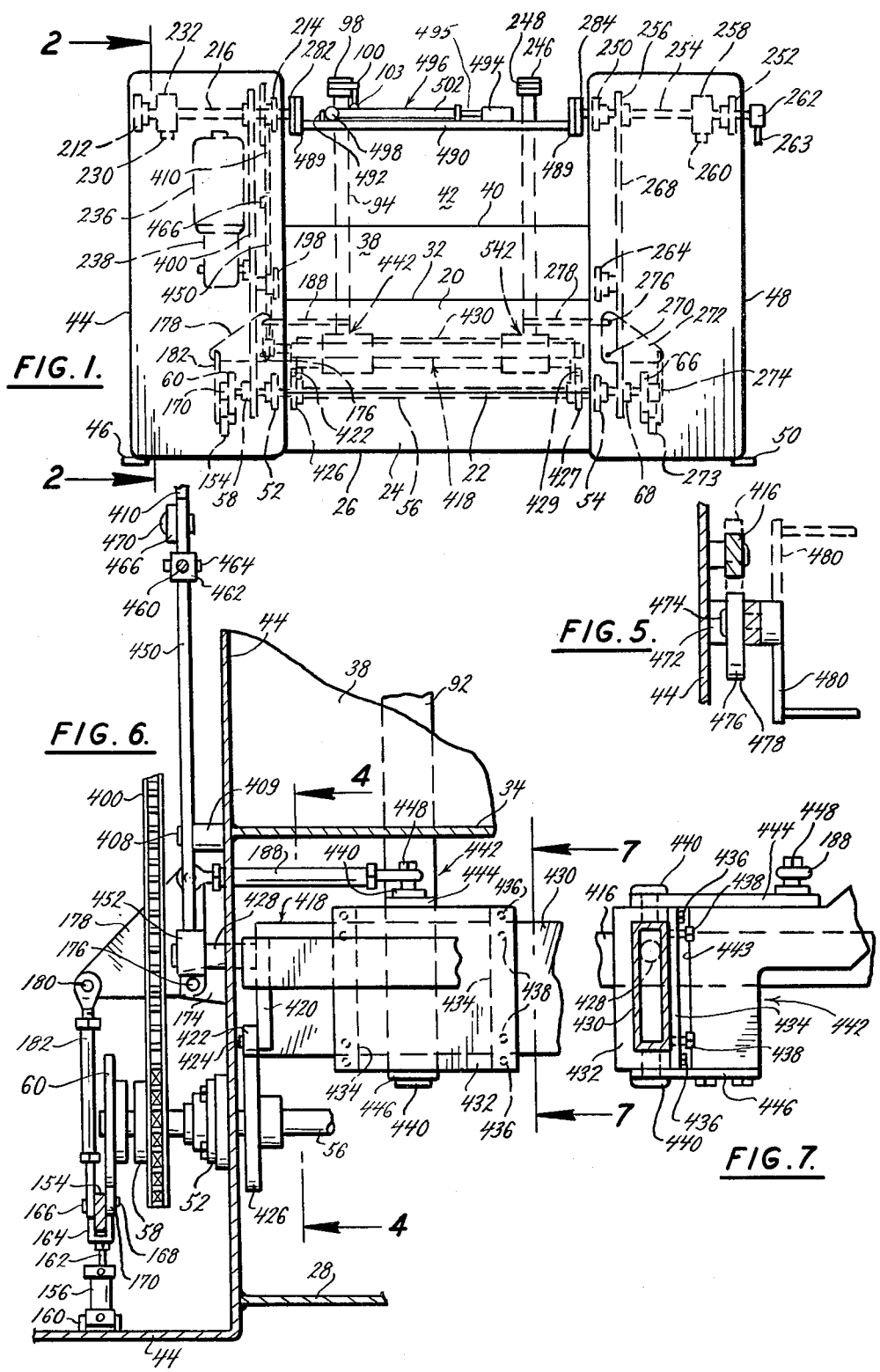
FIG. 1 is a front elevational view, on a small scale, of one preferred embodiment of welding machine that is made in accordance with the principles and teachings of the present invention.

Referring to FIGS. 1-11 in detail, the numeral 20 denotes a vertically-directed portion of a wide metal plate, the numeral 22 denotes a bend line in that plate at the lower edge of portion 20, and the numeral 24 denotes a downwardly and rearwardly-inclined portion of that plate. The numeral 26 denotes a bend line at the lower edge of portion 24, the numeral 28 denotes a horizontally-directed, rearwardly-extending portion of that plate, and the numeral 30 denotes an upwardly-bent flange at the rear edge of portion 28. The numeral 32 denotes a bend line at the upper edge of portion 20 of the metal plate; and the numeral 34 denotes a portion of that plate which is horizontally-directed and which extends rearwardly from that bend line. The numeral 36 denotes a bend line at the rear of portion 34; and the numeral 38 denotes a portion which inclines upwardly and rearwardly from that bend line. The numeral 40 denotes a bend line between portion 38 and a vertically-directed portion 42 of that plate. The portions 20, 24, 28, 30, 34, 38 and 42 preferably will be identical to the identically-numbered portions of the corresponding plate in the patented welder.

Figure 2:
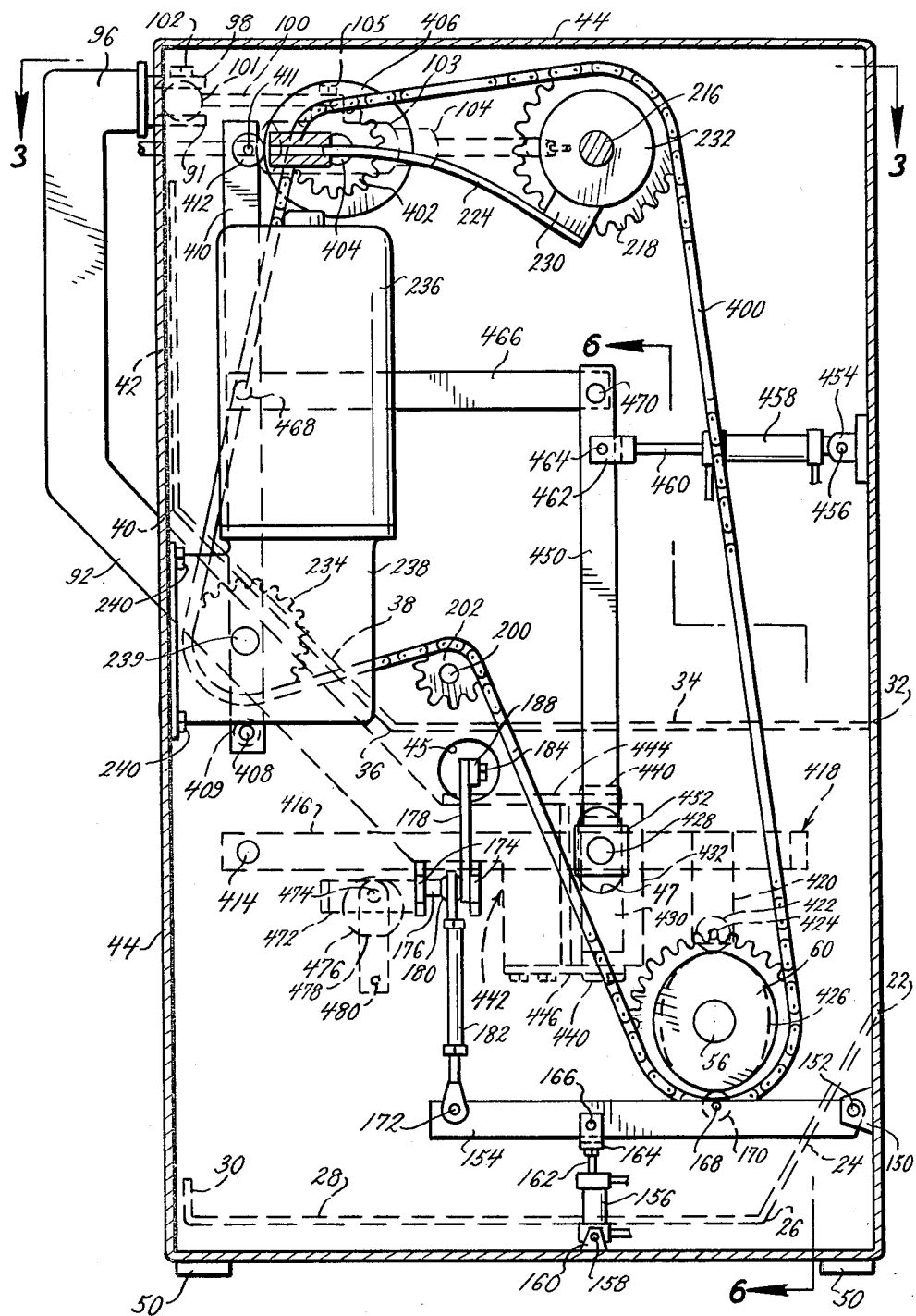
FIG. 2 is a sectional view, on a larger scale, which is taken along the plane indicated by the line 2—2 in FIG. 1.
Figure 8:
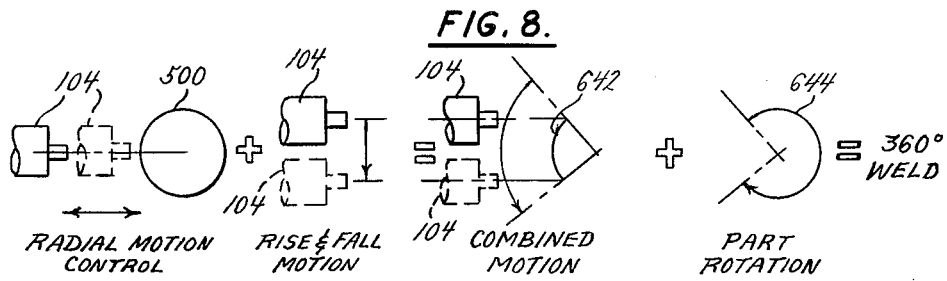
FIG. 8 is a diagrammatic view which shows how horizontal and vertical components of movement of a welding torch can provide a vertically-directed composite arcuate movement of that welding torch which will coact with rotation of a workpiece through two hundred and seventy degrees to permit a continuous three hundred and sixty degree weld to be formed on that workpiece.

The numeral 44 denotes a prismatic enclosure which has the inner wall thereof welded to the adjacent edges of the portions 20, 24, 28, 30, 34, 38 and 42 of the wide metal plate. Openings 45 and 47 are formed in that inner wall, as shown particularly by FIG. 2. Feet 46 are provided for that enclosure, as shown by FIG. 1. The numeral 48 denotes a prismatic enclosure which is similar to the enclosure 44; and the inner wall of that enclosure is welded to the adjacent edges of portions 20, 24, 28, 30, 34, 38 and 42 of the wide metal plate. Feet 50 are provided for that enclosure, as indicated by FIGS. 1 and 2. Openings, not shown, which are comparable to the openings 45 and 47 in the inner wall of enclosure 44, are provided in the inner wall of the enclosure 48. Except for the opening 47 and its counterpart, the enclosures 44 and 48 preferably will be essentially identical to the similarly-numbered enclosures in the patented welder.

The numeral 52 denotes a bearing housing at the left-hand face of the inner wall of enclosure 44, as shown by FIGS. 1, 3 and 6; and the numeral 54 denotes a similar bearing housing at the right-hand face of the inner wall of enclosure 48. An elongated shaft 56 extends through openings, not shown, in the inner walls of enclosure 44 and 48 and through the bearing housings 52 and 54 to support a sprocket gear 58 and a cam 60 within enclosure 44 and to support a sprocket gear 68 and a cam 66 within enclosure 48. The bearing housings 52 and 54, the shaft 56, and the sprocket gears 58 and 68 preferably will be identical to the identically-numbered components of the patented welder.

Referring particularly to FIG. 2, the numeral 91 denotes a movable plate which coacts with a fixed upper plate to constitute a clamp 98. Spherical recesses at the inner surfaces of those plates receive a ball 101 at the rear end of a supporting plate 100. That supporting plate is thin enough, relative to the space between the plate of clamp 98, to enable that supporting plate to be tilted at any desired angle and to be rotated to any desired position. Once the plate 100 has been given a desired position, set screws 102 can be tightened to urge the plates of clamp 98 into holding engagement with the ball 101. The clamp 98 extends forwardly from a horizontally-directed portion 96 of a non-linear arm of an elongated, angular, pivoted support 442. That non-linear arm has a rearwardly and upwardly-inclined portion 92, and a vertically-directed portion 94; and the latter portion is contiguous to the horizontally-directed portion 96. The numeral 103 in FIGS. 2 and 3 denotes a split-sleeve holder for a welding torch 104; and that holder is secured to the plate 100 by a screw 105.

The movable plate 91, the inclined portion 92, the vertical portion 94, the horizontally-directed portion 96, the clamp 98, the supporting plate 100, the ball 101, the set screws 102, the holder 103, the torch 104, and the screw 105 preferably will be identical to the identically-numbered plates, portions, clamp, ball, screws, holder and torch in the patented welder. However, the lower portion of the elongated, angular, pivoted support 442 differs from the lower portion of the corresponding elongated, angular, pivoted support in the patented welder.

Referring particularly to FIG. 2, the numeral 150 denotes two plates which are secured to the lower portion of the inner face of the front wall of enclosure 44 to constitute a pivot bracket; and a pivot 152 secures an elongated horizontally-directed arm 154 to that bracket. A pneumatic cylinder 156 has the lower end thereof secured to the bottom of enclosure 44 by small plates 160 and a pivot 158. The piston 162 of that cylinder has a clevis-like upper end 164; and a pin 166 secures that upper end to lever 154. A pivot 168 rotatably secures a roller 170 to the arm 154; and that roller engages, and serves as a follower for, cam 60. A pin 172 connects the lower end of an adjustable-length link 182 to the free end of arm 154. Small plates 174 at the left-hand face of the inner wall of enclosure 44 support a pivot 176 which supports a hub adjacent the lower edge of a generally-triangular plate 178. A pin 180 is carried by the outer end of triangular plate 178, and it secures that plate to the upper end of the adjustable-length link 182; and a pin 184 secures the upper end of that plate to an adjustable-length link 188. Arm 154, cylinder 156, piston 162, triangular plate 178, and adjustable-length links 182 and 188 will preferably be identical to the identically-numbered corresponding components of the patented welder; and they will preferably be supported and guided by components which are identical to corresponding components in that patented welder.

A bearing housing 198 in FIGS. 1 and 3 is secured to the inner wall of enclosure 44; and a pivot 200 is supported by that housing. A sprocket gear 202 is mounted on and rotates with that pivot. That bearing housing, pivot and sprocket gear will preferably be identical to the identically-numbered corresponding elements in the patented welder.

The numeral 212 in FIGS. 1 and 3 denote a pivot block at the upper portion of the inner face of the outer wall of enclosure 44; and the numeral 214 denotes a similar pivot block at the upper portion of the inner wall of that enclosure. A shaft 216 is rotatably held by bearings within those blocks; and a sprocket gear 218 and a slip ring 232 are fixedly mounted on that shaft. A bracket 222 at the inner face of the outer wall of enclosure 44 supports an elongated resilient arm 224 which holds an electrical brush 230 in engagement with the slip ring 232. Pivot blocks 250 and 252, a hollow rotatable shaft 254, a sprocket gear 256, a slip ring 258 and an electrical brush 260 are mounted within the enclosure 48, as shown by FIG. 1. The shafts 216 and 254, the pivot blocks therefor, the sprocket gears 218 and 256, the slip rings 232 and 258, and the electrical brushes 230 and 260 will preferably be identical to the identically-numbered corresponding components of the patented welder.

The numeral 236 denotes an electric motor which is disposed within the enclosure 44, as shown by FIGS. 1–3; and a gear housing 238 is secured to the lower end of that motor. Screws 240 secure that gear housing to the rear wall of enclosure 44, as shown by FIGS. 2 and 3. The output shaft 239 of that gear housing has a sprocket gear 234 mounted on it to drive a sprocket chain 400. That sprocket chain engages and drives sprocket gears 58, 202 and 218, and also engages and drives a sprocket gear 402 which is mounted on and rotates with a pivot 404 in the upper left-hand portion of FIG. 2. Sprocket gear 58 will rotate the shaft 56, and will thereby rotate the sprocket gear 68 in the enclosure 48. A sprocket chain 268 within enclosure 48 is driven by the sprocket gear 68; and that sprocket chain drives sprocket gear 256 and shaft 254 and also drives a sprocket gear, not shown, that is similar to sprocket gear 202 and that is mounted on a pivot which is rotatably held by a bearing block 264 within enclosure 48.

The numeral 542 in FIG. 1 denotes an elongated, angular, pivoted support which will preferably be identical to elongated, angular pivoted support 442. The elongated, angular pivoted support 542 has a slotted clamp 246 which holds a plate 248 to which a welding torch, not shown, can be secured.

The numeral 262 in the upper right-hand portion of FIG. 1 denotes a rotation-enabling coupling which is mounted on the outer end of the hollow shaft 254. That coupling provides an air-tight seal between the hollow center of that shaft and an air hose 263, while permitting that air hose to remain stationary despite rotation of that shaft.

The numeral 270 denotes a pivot which is suitably secured to the inner wall of enclosure 48, as indicated by FIG. 1; and that pivot is generally in register with the pivot 176 within enclosure 44. A generally-triangular plate 272 is rotatably mounted on pivot 270; and a vertically-directed adjustable-length link 274 connects the outer end of that plate to the rear end of an elongated horizontally-directed arm 273. A pin 276 at the upper end of plate 272 supports one end of a horizontally-directed adjustable-length link 278 which has the other end thereof pivotally connected to the elongated, angular, rotatable support 542. Pivot 270, plate 272, elongated arm 273, pin 276, and adjustable-length links 274 and 278 will preferably be identical to the identically-numbered, corresponding components of the patented welder.

The numeral 282 denotes a face plate which is mounted on the inner end of shaft 216, as shown by FIGS. 1 and 3. The numeral 284 denotes a similar face plate which is mounted on the inner end of the shaft 254, as shown by FIG. 1. The axes of those shafts, and hence the axes of those face plates, are coincident.

The numeral 406 in FIGS. 2 and 3 denote a cam which is mounted on, and rotates with, the shaft 404. The numeral 408 denotes a pivot which is secured to the inner wall of enclosure 44 by a boss 409, as shown particularly by FIG. 6; and that pivot supports an elongated, straight, vertically-directed lever 410, as shown particularly by FIG. 2. A roller 412 is rotatably secured to the upper end of lever 410 by a pivot 411; and that roller engages, and serves as a follower for, the cam 406.

The numeral 414 denotes a pivot which is secured to the inner wall of enclosure 44 by a boss 415, as shown by FIG. 3. A similar pivot, not shown, is secured to the inner wall of enclosure 48 by a similar boss, not shown. A large U-shaped bracket 418 has the closed portion thereof extending across the space between the inner walls of enclosures 44 and 48, as indicated particularly by FIGS. 1, 3 and 6; and the left-hand arm 416 of that bracket is generally horizontally-directed, and it extends rearwardly along the inner face of the inner wall of enclosure 44 as indicated by FIGS. 3 and 4. A short, vertically-directed plate 420 is welded or otherwise secured to the arm 416; and it extends downwardly from that arm, as indicated particularly by FIG. 4. A pivot 424 rotatably secures a roller 422 to that plate; and that roller engages, and serves as a follower for, a cam 426 which is mounted on shaft 56, as shown particularly by FIGS. 2, 4 and 6. A similar cam 427 is mounted on the other end of shaft 56 adjacent the inner wall of enclosure 48. A roller 429, that is mounted on the end of a plate which is similar to plate 420 and which extends downwardly from the other arm of U-shaped bracket 418, engages, and serves as a follower for, the cam 427, as indicated by FIG. 1.

The numeral 430 denotes an elongated hollow beam of rectangular cross section; and that beam is disposed between the arm 416 and the other arm, not shown, of the U-shaped bracket 418. Aligned openings in those arms are aligned with openings in end plates, not shown, for that beam, and also are aligned with the opening 47 in the inner wall of enclosure 44. Thereafter, the outer wall of enclosure 44 is removed; and then an elongated shaft 428 is successively inserted through opening 47, the opening in arm 416, the opening in the left-hand end plate of beam 430, through the full length of that beam, through the opening in the right-hand end plate of that beam, and then into the opening in the other arm of U-shaped bracket 418. That shaft will enable that U-shaped bracket to support that beam; but that shaft will be rotatable relative to the arms of that bracket. The opening 47 has a vertical axis which is longer than the horizontal axis of that opening; and hence that opening permits vertical movement of the shaft 428, and hence of the beam 430. Pins, not shown, pass through collars on the end plates of beam 430 and also through the shaft 428 to force that beam and shaft to rotate as a unit.

The numeral 432 denotes a U-shaped bracket which encases the front, top and bottom of a short length of the beam 430, as shown particularly by FIGS. 6 and 7. Retainer plates 434 are disposed at the rear face of that beam and in engagement with the outer ends of the horizontally-directed upper and lower flanges of bracket 432. Screws 436 extend through those retainer plates and seat in threaded sockets in those horizontally-directed flanges to enable bracket 432 and those plates to closely encircle beam 430. Set screws 438 pass through the retainer plates 434 to bear against the rear face of beam 430, and thereby fix the axial position of bracket 432 on that beam. By loosening and then re-tightening the set screws 438, it is possible to shift the bracket 432 to any desired position along the length of beam 430. However, once those set screws have been tightened, the bracket 432 will move as a unit with the beam 430.

The elongated, angular, pivoted support 442 has a deep, horizontally-directed portion at the front thereof, as shown particularly by FIG. 7; and a flat plate 444 abuts, and extends forwardly beyond, the upper surface of that portion. A flat plate 446 abuts, and extends forwardly beyond, the lower surface of that portion. The plate 444 will preferably be welded to the upper surface of the deep, horizontally-directed portion of the pivoted support 442; and screws will releasably secure the lower plate 444 to that portion. Shouldered screws 440 extend through openings in the forward ends of the plates 444 and 446 and seat within threaded sockets in the upper and lower flanges of the bracket 432. Those screws serve as pivots to permit those plates, and hence the pivoted support 442, to pivot about the vertical axis which is defined by those screws. The forward edge 443 of the deep, horizontally-directed portion of the pivoted support 442 is spaced rearwardly of the rear face of the beam 430 to keep that forward edge from limiting rotation of that pivoted support.

A pin 448 pivotally secures the inner end of the adjustable-length link 188 to the plate 444 and to the deep, horizontally-directed portion of the pivoted support 442. As a result, that adjustable-length link can respond to rotation of the triangular plate 178— which is caused by cam 60, cam follower 170, arm 154 and adjustable-length link 182— to rotate the elongated, angular, pivoted support 442 about the axis which is defined by the screws 440. A pin, not shown, which is similar to pin 448 will connect the inner end of adjustable-length link 278 to the deep, horizontally-directed portion of the elongated, angular, pivoted support 542 in FIG. 1 to enable that pivoted support to rotate in response to cam 66, arm 273, adjustable-length link 274, and triangular plate 272.

Referring particularly to FIGS. 2 and 6, the numeral 450 denotes an elongated straight lever which has a hub 452 at the lower end thereof; and that hub telescopes over and is fixedly secured to that portion of pivot 428 which extends outwardly through the opening 47 in the inner wall of enclosure 44. That clamp will force that pivot, and hence the elongated beam 430, to rotate as a unit with the lever 450.

A pivot bracket 454 is secured to the upper portion of the inner face of the front wall of enclosure 44, as shown particularly by FIG. 2; and a pivot 456 rotatably secures a pneumatic cylinder 458 to that pivot bracket. The piston 460 of that cylinder has a clevis-like outer end 462 which telescopes over a portion of the upper end of lever 450; and a pin 464 secures that clevis-like end to that lever. The numeral 466 denotes a horizontally-directed connecting rod which is pivoted to lever 410 by a pin 468 and which is pivoted to the lever 450 by a pin 470.

As shown particularly by FIGS. 2–5, a U-shaped bracket 472, which underlies the arm 416 of U-shaped bracket 418, is secured to the inner wall of enclosure 44. A pivot 474, which is journaled in bracket 472, extends through that inner wall to interrelate a cam 476 with a crank 480; so rotation of that crank will enforce rotation of that cam. That cam has a flat 478 thereon, as indicated particularly by FIG. 4.

The cam 476 underlies the arm 416 of U-shaped bracket 418; and that cam will normally be in the lower position shown by solid lines in FIG. 4. As long as that cam is in that lower position, the roller 422 will be permitted to bear against the cam 426 and to respond to the "rises" and "falls" on that cam to raise and lower bracket 418, pivot 428, beam 430, and elongated angular pivoted support 442. However, when the crank 480 is used to set cam 476 in the dotted-line position of FIG. 4, the flat 478 thereon will hold the arm 416 far enough above the cam 426 to keep the highest "rise" or "dwell" on cam 426 from engaging the roller 422. As a result, when the cam 476 is in that dotted-line position, it will force the U-shaped bracket 418 to raise the adjacent end of beam 430 to a level at which that beam will not be raised or lowered by cam 426 and follower 422. A bracket, pivot, cam and crank, not shown, which are identical to bracket 472, pivot 474, cam 476 and crank 480, are provided adjacent the inner wall of enclosure 48 to selectively hold the other arm of U-shaped bracket 418, and hence the other end of beam 430, in raised position. By rotating the crank 480 and its counterpart from their lower positions to their upper positions, the operator of the welding machine can easily fix the vertical position of the beam 430. However, whenever it is desirable to have that beam rise and fall, the crank 480 and its counterpart will be set to permit cams 426 and 427 to coact with followers 422 and 429, respectively, to raise and lower bracket 418 and beam 430.

Referring particularly to FIGS. 1 and 3, the numeral 490 denotes a fixture which is generally rectangular in plan and which is generally planar in elevation. That fixture has upstanding ends 489 which are securable to the confronting faces of the face plates 282 and 284, as shown by FIG. 1. That fixture has a U-shaped opening 491 adjacent the midpoint of the rear edge thereof, as shown by FIG. 3. A V-block 492, which serves as a stop for a workpiece 496, is located adjacent one end of the upper surface of fixture 490; and pneumatic cylinders 494 are located adjacent the opposite end of that upper surface. That workpiece is shown as having a tubular portion 498 of relatively-large diameter and two tubular portions 500 and 502 of smaller diameter. To facilitate the positioning of the smaller-diameter tubular portions 500 and 502 at right angles to the axis of tubular portion 498, as shown particularly by FIG. 3, the ends of those tubular portions may be notched to conform to the surface of the tubular portion 498. The tubular portions 500 and 502 can be held at the proper angle relative to the tubular portion 498 by conventional fixture tooling. When the pistons 495 of the cylinders 494 bear against the right-hand ends of the tubular portions 500 and 502, as indicated by FIG. 1, those tubular portions will force the tubular portion 498 into holding engagement with the V-block 492. FIGS. 1, 3 and 9–11 show the tubular portion 502 abutting the tubular portion 498 while the joint between the latter tubular portion and tubular portion 500 is being welded; and that was done to show that after one of the tubular portions 500 and 502 has been welded to the tubular portion 498, the other of the tubular portions 500 and 502 would strike the welding torch 104 if the workpiece were to be rotated through more than two hundred and seventy-degrees. In actual practice, the tubular portion 502 will not be assembled with the tubular portion 498 until after the joint between the latter tubular portion and tubular portion 500 has been welded.

As shown particularly by FIG. 3, the joint between the tubular portion 500 and the tubular portion 498 overlies the U-shaped opening 491 in the rear edge of fixture 490. As a result, if the workpiece 496 could be rotated three hundred and sixty degrees, the welding torch 104 could provide a continuous weld of three hundred and sixty degrees angular extent for the joint between the portions 498 and 500 without raising or lowering that torch. However, because the tubular portion 502 would strike the welding torch 104 if the workpiece 496 were to be rotated through three hundred and sixty degrees after the joint between the tubular portions 498 and 502 had been welded and while the joint between the tubular portions 498 and 500 was being welded, it is necessary to limit the rotation of that workpiece to an angle substantially less than three hundred and sixty degrees.

To enable the welding torch 104 to provide a continuous weld of three hundred and sixty degrees for the joint between the portions 498 and 500—even though the workpiece 496 is rotated less than three hundred and sixty degrees—that torch is moved vertically through a path which will keep the tip of that torch an essentially-fixed distance from the joint which is to be welded. Because the portions 498 and 500 of the workpiece 496 are right-circular cylinders and are normal to each other, the vertical path for the welding torch 104 is a simple arc of constant radius about the axis of the portion 500. However, if the portion 500 were to be L-shaped, U-shaped or otherwise polygonal in cross section, the vertical path for the welding torch 104 would be exceedingly complex; because it would have to repeatedly include movements of the tip of that torch through varying distances horizontally relative to that axis during the progressive movement of that torch in the vertical direction. By providing appropriate "rises" and "falls" on the cams 426 and 427, and by providing appropriate "rises", "falls" and "dwells" on the cam 406, the cam followers 422 and 429, bracket 418, pivot 428, beam 430 and elongated arcuate pivoted support 442 will provide the required vertical component of motion, and the cam follower 412, levers 410 and 450, connecting rod 466, pivot 428, beam 430 and elongated arcuate pivoted support 442 will provide the required horizontal component of motion. Simultaneously, appropriate "rises", "falls" and "dwells" on the cam 60 will cause cam follower 170, arm 154, adjustable-length links 182 and 188, and beam 430 and elongated arcuate pivoted support 442 to provide the horizontal lateral movement of the outer end of torch 104 which is needed to continuously hold the tip of that torch at an optimum angle relative to the joint which is to be welded.

Different sets of cams 60, 426 and 427, and 406 will be required for each individually-different workpiece. To weld the joint between the portions 498 and 500 of workpiece 496, the welding torch 104 must twice be moved through the horizontal distance adjacent the notation Radial Motion Control in FIG. 8 while it is moved once through the vertical distance adjacent the notation Rise & Fall Motion in that view. The resulting composite motion of the tip of that torch is denoted by the numeral 642 in FIG. 8; and the ninety degrees of that composite motion add to the two hundred and seventy degree rotation of tubular portion 500, which is denoted by the numeral 644, to provide the desired relative movement of three hundred and sixty degrees between that tubular portion and that tip.

Figure 9:
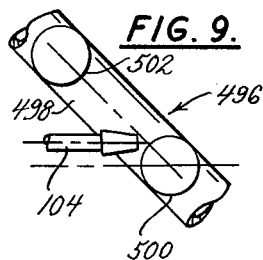
FIG. 9 is a kinematic view which shows the starting position of a workpiece and of a welding torch.

In welding the joint between the portions 498 and 500 of workpiece 496, the cylinder 458 will initially act through piston 460, lever 450, beam 430 and elongated angular pivoted support 442 to hold the welding torch 104 an appreciable distance to the left of the position shown by FIG. 2 so the motor can rotate the workpiece 496 to the position shown by FIG. 9. Thereafter, that cylinder will act through that piston and lever, connecting rod 466 and lever 410 to hold cam follower 412 in engagement with cam 406, and thereby dispose the welding torch in the dotted-line Radial Motion Control position in FIG. 8. At that same time, cams 426 and 427, cam followers 422 and 429, U-shaped bracket 418, pivot 428, beam 430 and elongated angular pivoted support 442 will be holding welding torch 104 in the solid line Rise & Fall Motion position in FIG. 8; and cam 60, cam follower 170, arm 154, adjustable-length links 182 and 188, and elongated angular pivoted support 442 will be holding the tip of that welding torch at an optimum angle relative to the joint between the portions 498 and 500.

Figure 10:
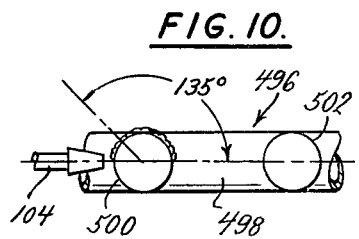
FIG. 10 is a kinematic view of the workpiece and welding torch of FIG. 9 after each of them has moved one-half of their lengths of movement during the forming of a weld.
Figure 11:
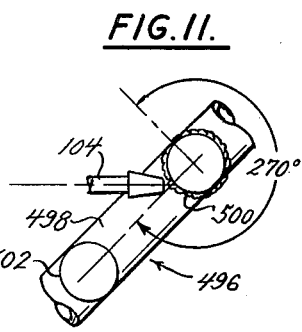
FIG. 11 is a kinematic view which shows the workpiece and welding torch of FIG. 9 in the positions they occupy at the ends of their paths of movement during the forming of a weld.

Thereupon, the motor 236 will cause the fixture 490 to rotate the workpiece 496 in the clockwise direction from the position of FIG. 9 to the position of FIG. 11. During the one hundred and thirty-five degrees of rotation of that workpiece, from the position of FIG. 9 to the position of FIG. 10, the cams 426 and 427 and the components responsive thereto will cause the welding torch 104 to move downwardly from the position of FIG. 9 to the position of FIG. 10, and cam 406 and the components responsive thereto will cause that welding torch to move outwardly from the position of FIG. 9 to the position of FIG. 10. The resulting forty-five degree composite motion of that welding torch will coact with the one hundred and thirty-five degree rotation of workpiece 496 to permit a continuous weld of one hundred and eighty degrees. The motor 234 will cause the workpiece 496 to continue its uninterrupted rotation toward the position of FIG. 11; and, during the one hundred and thirty-five degrees of rotation of that workpiece from the position of FIG. 10 to the position of FIG. 11, the cams 426 and 427 and the components responsive thereto will cause the welding torch 104 to move downwardly from the position of FIG. 10 to the position of FIG. 11, but cam 406 and the components responsive thereto will cause the welding torch to move inwardly from the position of FIG. 10 to the position of FIG. 11. The resulting forty-five degree composite motion of that welding torch will coact with the one hundred and thirty-five degree rotation of workpiece 496 to permit a continuous weld of one hundred and eighty degrees. During the entire rotation of workpiece 496 from the position of FIG. 9 to the position of FIG. 11, cam 60 and the components responsive thereto will cause the tip of welding torch 104 to be held at an optimum angle relative to the joint between the portions 498 and 500. The overall result is that a smooth, continuous, well-formed three hundred and sixty degree weld will be provided at the joint between portions 498 and 500.

Where both portions of a workpiece are right-circular cylinders, and where those portions are normal to each other, the profiles of cams 60, 406, and 426 and 427 are relatively simple. As a result, a skilled and mathematically-oriented tool maker should be able to define those profiles by mathematical processes. However, if a tool maker is not mathematically-oriented, or if the portions of the workpiece are L-shaped, U-shaped or otherwise polygonal in cross section, it will usually be desirable to make actual measurements and then plot the profiles of the cams 60, 406, and 426 and 427. Specifically, the workpiece can be secured to a fixture similar to the fixture 490, that fixture and workpiece can be rotated, step by step, through the desired number of degrees of rotation, the welding torch 104 can be set, step by step, in the desired vertical, radial and torch-angle positions, and then precise measurements can be made of the radial distances between cam followers 170 and 422 and the axis of shaft 56 and of the radial distance from cam follower 412 and the axis of shaft 404. Those precise measurements can then be used in plotting the profiles of cam 60, 426 and 406.

The downward and outward movement of the welding torch 104 from the position of FIG. 9 to the position of FIG. 10 requires simultaneous downward movement and counter clockwise rotation of beam 430. That downward movement is effected by "falls" on cams 426 and 427 which permit the weight of U-shaped bracket 418, beam 430, and of pivoted supports 442 and 542 to force the cam followers 422 and 429 to follow those "falls". The outward movement of torch 104 is effected by a "rise" on cam 406 which forces cam follower 412 to rotate lever 410, and hence lever 450, pivot 428, beam 430 and rotatable support 442, in the counter clockwise direction. The "falls" on cams 426 and 427 must be interrelated to the "rise" on cam 406 so the tip of the torch 104 maintains a predetermined distance from the joint between the portions 498 and 500. Also, the corresponding portion of the profile of the cam 60 must be interrelated to the "rise" on cam 406 and to the "falls" on cams 426 and 427 to keep the tip of the welding torch at an optimum torch angle.

The downward and inward movement of the welding torch 104 from the position of FIG. 10 to the position of FIG. 11 requires simultaneous downward movement and clockwise rotation of beam 430. That downward movement is effected by continuing "falls" on cams 426 and 427 which permit the weight of U-shaped bracket 418, beam 430, and of the pivoted supports 442 and 542 to force the cam followers 422 and 429 to follow those continuing "falls". The inward movement of torch 104 is effected by a "fall" on cam 404 which permits cylinder 458 to cause cam follower 412 to rotate lever 410, and hence lever 450, pivot 428, beam 430 and rotatable support 442 in the clockwise direction. The continuing "falls" on cams 426 and 427 must be interrelated to the "fall" on cam 406 so the tip of the torch 104 maintains a predetermined distance from the joint between the portions 498 and 500. Also, the corresponding profile of the cam 60 must be interrelated to the "fall" on cam 406 and to the continuing "falls" on cams 426 and 427 to keep the tip of the welding torch at an optimum torch angle.

At the conclusion of the continuous three hundred and sixty degree weld, the motor 236 will be reversed, and it will rotate the fixture 490 and the workpiece 496 back to the position shown by FIG. 9. As that fixture so rotates, the cylinder 458 will again act through piston 460, lever 450, pivot 428, beam 430, and pivoted support 442 to hold the welding torch 104 away from the workpiece 496. While the fixture 490 is in the position corresponding to FIG. 9, the welded workpiece 496 can be removed, and the portions of a further workpiece can be secured to that fixture.

It will be noted that the axis of cam follower 412 is confined for substantially straight-line horizontal movement. This is due to the fact that lever 410 is long, rotates around fixed pivot 408, and always is close to vertical. Consequently, even though the lever 450 can be moved vertically a distance equal to twice the product obtained by multiplying the radius of the concentrically-rotated workpiece by seventy thousand seven hundred and eleven millionths (0.70711)—the sine of forty-five degrees—the vertical position of cam follower 412 will remain substantially constant. Even if the maximum radial difference between the highest and lowest "dwells" on cam 406 was a full inch, and even if all of the resulting rotation of lever 410 was away from vertical, the maximum change which that rotation could produce in the vertical position of cam follower 412 would be just slightly more than two hundredths (0.02) of an inch if the lever 410 was twenty-four (24) inches long. Even if that lever was only fourteen (14) inches long, and even if the maximum radial difference between the highest and lowest "dwells" on cam 406 was a full inch, the maximum change which rotation of lever 410 could produce in the vertical position of cam follower 412 would be less than four hundredths (0.04) of an inch. In contrast, the upper end of the lever 450 must move seventy thousand seven hundred and eleven millionths (0.70711) of an inch when the portion 500 of workpiece 496 has a diameter of one inch.

If the cam follower 412 were to be mounted so it moved vertically with the lever 450, that movement would materially complicate the task of defining the profile of cam 406; because that movement would cause that cam follower to engage that cam profile at different vertical levels. The cam 406 is essentially a circular disc with "rises" and "falls" thereon; and hence a change in the level of the point of engagement between cam follower 412 and that cam would almost certainly produce a sideways movement of that cam follower—unless the profile of that cam was specially modified to prevent any sideways movement.

The serious nature of the problem which could arise if cam follower 412 were to move vertically with lever 450 is well illustrated by the following assumed conditions: (1) the normal, unrelieved diameter of cam 406 is five inches, (2) the diameter of tubular member 500 is one inch, and (3) cam follower 412 engages cam 406 at the level of the axis of shaft 404 when lever 450 is in its uppermost position. Under those assumed conditions, the cam 406 should move cam follower 412 one hundred and forty-six thousandths (0.146) of an inch to the left from the position of FIG. 9 to the position of FIG. 10, and should then move that cam follower an equal distance to the right from the position of FIG. 10 to the position of FIG. 11. However, the seventy thousand seven hundred and eleven millionths (0.70711) of an inch of downward movement, which lever 450 would impart to cam follower 412, would cause that cam follower to shift to the right a distance of one hundred and two thousandths (0.102) of an inch—a distance which is sixty-nine percent (69%) of the Radial Motion Control distance required by FIG. 8. Also, because that undesired right-hand sideways movement would occur in part while cam follower 412 was supposed to be moving to the left, that right-hand movement would seriously complicate the problem of defining the profile of cam 406.

The mounting of the cam follower on lever 410, which is held against vertical movement, which is long, and which is always close to vertical so limits the vertical range of points at which cam follower 412 can engage cam 406 that the profile of cam 406 does not need to include any compensation for undesired sideways movement of that cam follower. In fact the profile of cam 406 would not need to include any compensation for undesired sideways movement of cam follower 412 even if the welding machine were to be built so it was large enough to accommodate continuously-rotated workpieces of many inches in diameter.

Where the welding machine is to be used with a workpiece which can be rotated through three hundred and sixty degrees, it will neither be necessary nor desirable for the beam 430 to be moved vertically. In such event, the lever 480, and its counterpart adjacent enclosure 48, will be rotated from the solid-line position to the dotted-line position of FIG. 4. Thereafter, the cam 476, and its counterpart adjacent enclosure 48, will hold the U-shaped bracket 418, and hence the beam 430 and the pivoted supports 442 and 542, at a fixed level.

Referring particularly to FIGS. 12-16, the numerals 32, 34, 45, 50, 44, 56, 58 and 60 denote a bend, a flat portion, an opening, feet, an enclosure, a shaft, a sprocket gear and a cam which are identical to the identically-numbered corresponding bend, flat portion, opening, feet, enclosure, shaft, sprocket gear and cam in FIGS. 1-7 and in the patented welder. Also, the numerals 154, 170, 188, 200 and 202 denote an arm, a cam follower, an adjustable-length link, a shaft and a sprocket gear which are identical to the identically-numbered corresponding arm, cam follower, adjustable-length link, shaft and sprocket gear therein.

The numeral 528 denotes an elongated pivot which extends through a hollow elongated beam 530; and that pivot and that beam preferably will be essentially identical to pivot 428 and beam 430 of FIGS. 1-7. The numeral 540 denotes shouldered screws which extend downwardly and upwardly through forwardly-extending plates on the deep forward portion of an elongated arcuate pivoted support 552 to seat within sockets in a U-shaped bracket 550. The pivoted support 552 and the bracket 550 will preferably be essentially identical to the pivoted support 442 and bracket 432 of FIGS. 1-7. Retainer plates 574 are provided at the rear of U-shaped bracket 550 to hold that bracket in assembled relation with the beam 530; and fasteners 576 secure those retainer plates to that bracket. The shouldered screws 540, and the spacing of the front edge 553 of the pivoted support 552 rearwardly of the bracket 550, permit that pivoted support to rotate relative to that bracket, and hence relative to the beam 530.

The numeral 560 in FIGS. 12-16 denote ears which are fixedly mounted on the inner wall of enclosure 44; and those ears extend into the space between that enclosure and enclosure 48. Similar ears, not shown, are fixedly mounted on the inner wall of enclosure 48; and those ears extend into the space between that enclosure and enclosure 44. A bracket 562, with an upper arm 564 and a lower arm 566, is pivotally secured to the ears 560 by a rod 558 that is secured within openings in those arms. That rod is held for vertical movement by the ears 560 to permit upward and downward movement of the bracket 562. A similar bracket and rod, not shown, are provided adjacent the enclosure 48. The bracket 562 and its counterpart have openings 572 therein through which the pivot 528 extends to enable those brackets to support that pivot and the beam 530.

Figure 15:
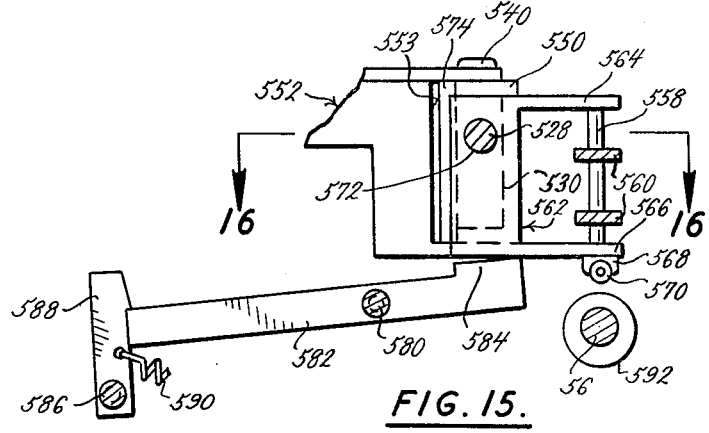
FIG. 15 is a sectional view which is taken along the plane indicated by the line 15—15 in FIG. 14.

A pivot bracket 568 is provided at the lower face of the lower arm 566 of bracket 562, as indicated particularly by FIG. 15. That bracket rotatably supports a roller 570 which bears against, and which is a follower for, a cam 592 that is mounted on the shaft 56. A similar cam follower and a similar cam are provided adjacent enclosure 48. "Rises" and "falls" on those cams will effect upward and downward movement of those cam followers, and hence of bracket 562 and its counterpart, pivot 528 and beam 530.

Figure 16:
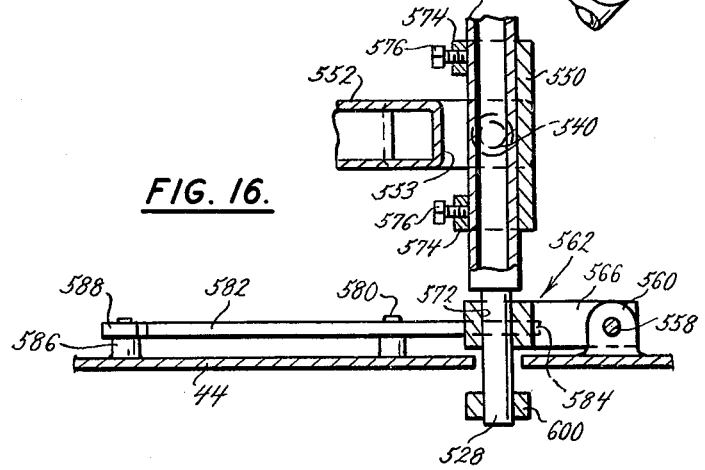
FIG. 16 is a sectional view which is taken along the plane indicated by the line 16—16 in FIG. 15.

The numeral 580 denotes a pivot which extends from the inner wall of enclosure 44 a short distance toward enclosure 48, as shown particularly by FIGS. 14 and 16. An elongated arm 582, with an upward extension 584 at the right-hand end thereof, is pivotally held by pivot 580; and that upward extension is in register with the bottom of the lower arm 566 of bracket 562, as indicated particularly by FIGS. 15 and 16. The numeral 586 denotes a pivot which extends a short distance from the inner wall of the enclosure 44 toward enclosure 48; and that pivot is located below the level of the left-hand end of arm 582, as that arm is viewed in FIGS. 15 and 16. A latch 588 is rotatably mounted on the pivot 586; and a helical extension spring 590 biases that latch for rotation in the clockwise direction toward the left-hand end of arm 582. A stop, not shown, limits clockwise rotation of the arm 582 to the horizontal position shown by FIG. 12, but will permit that arm to rotate in the counterclockwise direction to the position of FIG. 15. In the latter position, the extension 584 engages the plate 566 of bracket 562, and thereby holds cam follower 570 upwardly out of the path of the highest "rise" or "dwell" on cam 592, as indicated by FIG. 15. When the arm 582 is rotated to the position of FIG. 15, the latch 588 can be rotated into position to hold that arm in that position; and, thereafter, until that latch is released, the spring 590 will hold that latch in holding position. Further pivots 580 and 586, a further arm 582, and a further spring 590 will be disposed close to the inner wall of enclosure 48. As a result, both ends of the beam 530 can be raised upwardly and then held against vertical movement by appropriate rotation of the arms 582 and by the latching of latches 588.

The numeral 600 denotes a hub on the lower end of an elongated, straight lever 602; and that hub is suitably fixed to the pivot 528 by a key, set screw or pin. The upper end of that lever has a roller 604 rotatably secured thereto by a pivot 606; and that roller engages, and will serve as a follower for, a cam 620 which is generally similar to cam 406 in FIG. 2. A shaft 622, which is comparable to shaft 404 of FIG. 2, supports cam 620, and also supports a sprocket gear 624. A sprocket chain 626 engages sprocket gear 624, sprocket gear 58, sprocket gear 202, and a sprocket gear, not shown, which is comparable to the sprocket gear 234 in FIG. 2.

A pivot bracket 608 is provided at the upper portion of the inner surface of the front wall of enclosure 44, as shown particularly by FIG. 12; and a pivot 610 rotatably secures a pneumatic cylinder 612 to that pivot bracket. The piston 614 of that cylinder has a clevis-like end 616 that telescopes over an intermediate portion of lever 602 and is pivotally connected to that portion by a pin 618.

The structure in FIGS. 12-16 performs the same functions which the structure in FIGS. 1-7 performs. However, the structure in FIGS. 12-16 confines the beam 530 for precisely vertical movement, whereas the beam 430 in FIGS. 1-7 moves along an arcuate path as it is moved upwardly and downwardly. Because the distance between pivot 414 and pivot 428 in FIGS. 2 and 4 is very much greater than the maximum vertical movement of beam 430, that beam will follow an arcuate path which is so shallow that it resembles a straight line; and hence no modification of the "rises" and "falls" on cam 406 is needed to compensate for the non-linear movement of pivot 428, and beam 430 as they are raised and lowered. However, if the welding machine of the present invention were to be made large enough to weld devices which were very large in cross section, the arm 416, and its counterpart, of the U- shaped bracket 418 would have to be made unduly long to keep the arcuate path followed by pivot 428 shallow enough to resemble a straight line. In such event, the linear movement of beam 530 would be desirable.

The lever 602, and hence the cam follower 604, will move vertically as the beam 530 is moved vertically; and, in that respect, the structure of FIGS. 12-16 is not as desirable as the structure of FIGS. 1-7. However, the increased difficulties in designing the profile of cam 620, which inherently results from the vertical movement of lever 602 and of cam follower 604 with beam 530, can be lessened by providing a large diameter for that cam and also by disposing that cam follower a predetermined distance below the level of shaft 622 whenever beam 530 is in its lowermost position and by disposing that cam follower an equal distance above the level of that shaft whenever that beam is in its uppermost position. With such an arrangement, and by using great care, a profile for cam 620 can be developed which, together with carefully-developed profiles for cam 60 and cam 592 and its counterpart, will enable the tip of the welding torch 104 to closely "track" the joint to be welded.

It would be possible to use the structure of FIGS. 12-16 even if the upper and lower ends of the vertical path of movement of cam follower 604 were not disposed equal distances from the level of the axis of cam 620. However, if the upper and lower ends of the vertical path of movement of that cam follower were disposed equal distances from the level of the seven thirty o'clock point on cam 620, it would be very difficult to develop a properly-compensated profile for that cam. For example, if it were assumed that cam 620 had a normal, unrelieved diameter of five inches and that the portion 500 of workpiece 596 had a diameter of one inch, the cam follower 604 would have to move horizontally only slightly more than one hundred and forty-six thousandths (0.146) of an inch from the position of FIG. 9 to the position of FIG. 10 and then move that same distance back to the position of FIG. 11, but that cam follower would move almost six hundred and thirty thousandths (0.630) of an inch horizontally as the beam 530 moved that cam follower less than three hundred and fifty-four thousandths (0.354) of an inch above and below the level of the seven thirty o'clock point on cam 620. As a result, a toolmaker would have great difficulty in developing a cam profile which was intended to provide a desired "rise" of only slightly more than one hundred and forty-six thousandths (0.146) of an inch but which had to prevent a much greater—almost six hundred and thirty thousandths (0.630) of an inch—incipient horizontal movement due to the vertical movement of beam 530. That toolmaker would have considerable difficulty in developing a cam profile for cam 406 in FIG. 2 if the cam follower 412 were to be mounted on an upward extension of lever 450, and hence moved vertically as the beam 430 was moved vertically.

The structure shown in FIGS. 1-7 is preferred where the diameter of the concentrically rotated portion of the workpiece is less than three inches. For workpieces having larger concentrically rotated portions, the optimum structure would use the linear-movement mounting of FIGS. 12-16 for the beam, but would use the beam-tilting lever system of FIGS. 1-7. Such a structure could be made large enough to weld concentrically rotated portions of very large cross sections without any need of compensating for vertical movement of cam follower 412 or for non-linear vertical movement of beam 430.

FIGS. 8-11 indicate how a continuous three hundred and sixty degree weld can be provided by rotating a workpiece two hundred and seventy degrees and by moving a welding torch through a composite vertical path that corresponded to ninety degrees of rotation of that workpiece. If desired, however, the workpiece could be rotated as few as two hundred and forty degrees or could be rotated as many degrees as the configuration of the workpiece permits; and the composite vertical path for the torch could be made to correspond to as many as one hundred and twenty degrees of rotation of that workpiece or to any lesser desired number of degrees of that rotation.

If the operator of the welding machine of the present invention wished to provide a continuous weld of more than three hundred and sixty degrees—to make absolutely certain that no tiny air gap had formed between the beginning and end of that weld—and if the workpiece could not be rotated more than three hundred and sixty degrees, the workpiece would be rotated through an angle which would coact with the composite vertical movement of the welding torch to provide the desired angular extent of more than three hundred and sixty degrees for the weld. If that operator desired a continuous weld which had an angular extent that was substantially smaller than three hundred and sixty degrees but was larger than the angular rotation of the workpiece, the composite vertical movement of the welding torch would provide the relative movement between the welding torch and that workpiece which would provide the desired angular extent for the weld. It thus should be apparent that the welding machines provided by the present invention do not impose any top limit on the angular extent of continuous welds, and do not even impose limits on the angular extents of rotation of workpieces. Instead, any limits on the extents of rotation of those workpieces are imposed by the configurations of those workpieces, and continuous welds of greater angular extends can be provided by the composite vertical movement of the welding torch. As a result, it should be apparent that the present invention provides a method and structure for making continuous welds which have angular extents that are greater than the angular rotation of the workpieces.

In the embodiments of welding machine shown by the drawing, the cam followers 412 and 604 are, respectively, disposed at the left-hand sides of cams 406 and 620; and such dispositions are very useful. If desired, however, those cam followers could, by use of different lever systems therefor, be disposed at the tops, bottoms or right-hand sides of those cams. The most important consideration in mounting those cam followers adjacent those cams is that all movement of those cam followers, in a direction transverse of the desired movement in response to "rises" and "falls" on those cams, be kept small. In that sense, the arrangement shown in FIGS. 1-7 is ideal; because the fixed pivot 408 for lever 410 substantially prevents any movement of cam follower 412 in a direction which is transverse of the desired movement of cam follower 412 radially relative to cam 406. In that sense, the arrangement shown in FIGS. 12-16 is not ideal; but it is far better than an arrangement where the cam follower 604 would be disposed at the seven thirty o'clock position on cam 620, and hence would be displaced forty-five degrees from the point on the periphery of that cam wherein the cam follower could move radially relative to that cam.

It will be noted that the horizontal movement of pin 468, and hence of connecting rod 466, will be less than the horizontal movement of cam follower 412. Similarly, the horizontal movement of pin 470 will be less than the horizontal movement of cam follower 412. However, the horizontal movement of cam follower 412, which is needed to provide the desired horizontal movement of welding torch 104, is readily determined.

Whereas the drawing and accompanying description have shown and described a preferred embodiment and an alternate embodiment of the present invention, it should be apparent to those skilled in the art that various changes may be made in the form of the invention without affecting the scope thereof.

What I claim is:

1. A machine that provides relative movement between a workpiece and a work-performing element and which comprises a support for said workpiece, a support for said work-performing element, a reversible driving element, members operated by said driving element to provide rotation of one of said supports in a given direction and then in the opposite direction about a predetermined axis, further members operated by said driving element to provide movement of the other of said supports transversely of said predetermined axis, said further members causing said other support to follow a path which is a composite of a component of motion in one direction transversely of said predetermined axis plus a second component of motion in a different direction transversely of said predetermined axis, the first said members coacting with said driving element to limit rotation of said one support to a predetermined angle of less than three hundred and sixty degrees about said predetermined axis while said work-performing element is performing work on said workpiece, said first said members thereafter coacting with said driving member to rotate said one support in the opposite direction about said predetermined axis, said further members responding to said driving element to move said other support in a predetermined direction through said composite path and thereby provide relative movement between said workpiece and said work-performing element which resembles relative movement that would be produced between said workpiece and said work-performing element if said first said members were able to coact with said driving element to rotate said one support a substantial angular distance beyond the end of said predetermined angle, whereby said rotation of said one support in said given direction by said first said members and said movement of said other support in said predetermined direction by said further members enables said work-performing element to perform work on said workpiece of an angular extent which is substantially greater than said predetermined angle.

2. A machine as claimed in claim 1 wherein said workpiece includes two elements that are to be welded together, wherein said work-performing element is a welding torch, and wherein said one support would be intercepted and held by said other support or by said welding torch before said one support could rotate said substantial angular distance beyond said end of said predetermined angle.

3. A machine that provides relative movement between a workpiece and a work-performing element and which comprises a support for said workpiece, a support for said work-performing element, a reversible driving element, members operated by said driving element to provide rotation of one of said supports in a given direction and then in the opposite direction about a predetermined axis, further members operated by said driving element to provide movement of the other of said supports transversely of said predetermined axis, said further members causing said other support to follow a path which is a composite of a component of motion in one direction transversely of said predetermined axis plus a second component of motion in a different direction transversely of said predetermined axis, the first said members coacting with said driving element to limit rotation of said one support to a predetermined angle of less than three hundred and sixty degrees about said predetermined axis while said work-performing element is performing work on said workpiece, said first said members thereafter coacting with said driving member to rotate said one support in the opposite direction about said predetermined axis, said further members responding to said driving element to move said other support in a predetermined direction through said composite path and thereby provide relative movement between said workpiece and said work-performing element which resembles relative movement that would be produced between said workpiece and said work-performing element if said first said members were able to coact with said driving element to rotate said one support a substantial angular distance beyond the end of said predetermined angle, whereby said rotation of said one support in said given direction by said first said members and said movement of said other support in said predetermined direction by said further members enables said work-performing element to perform work on said workpiece of an angular extent which is substantially greater than said predetermined angle, said workpiece being releasably mounted on and being rotatable with said one support, said work-performing element being mounted on and being movable with said other support, and said one support being dimentioned so it would be intercepted and held by said other support or by said work-performing element before said one support could rotate three hundred and sixty degrees.

4. A machine as claimed in claim 1 wherein said workpiece is releasably mounted on and rotates with said one support and includes two elements that are to be welded together, wherein said work-performing element is mounted on and moves with said other support and is a welding torch, and wherein said welding torch can form a weld on said workpiece which has a greater angular extent that the angular movement of said one support while said welding torch is forming said weld on said workpiece.

5. A machine as claimed in claim 1 wherein said further members include a cam and a cam follower which provide said component of motion in said one direction transversely of said predetermined axis and also include a second cam and a second cam follower which provide said second component of motion in said different direction transversely of said predetermined axis, and wherein said workpiece or said one support would be intercepted and held against further rotation by said other support or said work-performing element in the event said one support were to be rotated through three hundred and sixty degrees in said given direction while said work-performing element was performing work on said workpiece.

6. A machine as claimed in claim 1 wherein said further members include a supporting element which is translated to provide said component of motion in said one direction transversely of said predetermined axis and which is rotated to provide said second component of motion in said different direction transversely of said predetermined axis.

7. A machine as claimed in claim 1 wherein said further members include a supporting element which is translated to provide said component of motion in said one direction transversely of said predetermined axis and which is rotated to provide said second component of motion in said different direction transversely of said predetermined axis, wherein said further members include a cam and a cam follower which translate said supporting element, and wherein said further members also include a second cam and a second cam follower which rotate said supporting element.

8. A machine as claimed in claim 1 wherein said further members include a cam and a cam follower which provide said component of motion in said one direction transversely of said predetermined axis and also include a second cam and a second cam follower which provide said second component of motion in said different direction transversely of said predetermined axis, wherein the first said cam follower is mounted on a lever which rotates about a fixed pivot and hence confines said first said cam follower for movement in a fixed path, and wherein said second cam follower is mounted on a second lever which rotates about a fixed pivot and hence confines said second cam follower for movement in a fixed path.

9. A machine as claimed in claim 1 wherein said further members include a supporting element which is translated to provide said component of motion in said one direction transversely of said predetermined axis and which is rotated to provide said second component of motion in said different direction transversely of said predetermined axis, and wherein said further members include a cam and a cam follower which translate said supporting element.

10. A machine as claimed in claim 1 wherein said further members include a supporting element which is translated to provide said component of motion in said one direction transversely of said predetermined axis and which is rotated to provide said second component of motion in said different direction transversely of said predetermined axis, and wherein said further members include a cam and a cam follower which rotate said supporting element.

11. A machine that provides relative movement between a workpiece and work-performing element and which comprises a support for said workpiece, a support for said work-performing element, a reversible driving element, members operated by said driving element to provide rotation of one of said supports in a given direction and then in the opposite direction about a predetermined axis, further members operated by said driving element to provide movement of the other of said supports transversely of said predetermined axis, said further members causing said other support to follow a path which is a composite of a component of motion in one direction transversely of said predetermined axis plus a second component of motion in a different direction transversely of said predetermined axis, the first said members coacting with said driving element to limit rotation of said one support to a predetermined angle of less than three hundred and sixty degrees about said predetermined axis while said work-performing element is performing work on said workpiece, said first said members thereafter coacting with said driving member to rotate said one support in the opposite direction about said predetermined axis, said further members responding to said driving element to move said other support in a predetermined direction through said composite path and thereby provide relative movement between said workpiece of said work-performing element which resembles relative movement that would be produced between said workpiece and said work-performing element if said first said members were able to coact with said driving element to rotate said one support a substantial angular distance beyond the end of said predetermined angle, whereby said rotation of said one support in said given direction by said first said members and said movement of said other support in said predetermined direction by said further members enables said work-performing element to perform work on said workpiece of an angular extent which is substantially greater than said predetermined angle, said further members including a cam and a cam follower which provide said component of motion in said one direction transversely of said predetermined axis and also including a second cam and a second cam follower which provide said second component of motion in said different direction transversely of said predetermined axis, the first said cam follower being mounted on a lever which rotates about a fixed pivot and hence confining said first said cam follower for movement in a fixed path, said second cam follower being mounted on a second lever which rotates about a fixed pivot and hence confining said second cam follower for movement in a fixed path, and said fixed path for said second cam follower being generally normal to said fixed path for said first cam follower.

12. A machine as claimed in claim 1 wherein said further members include a cam and a cam follower which provide said component of motion in said one direction transversely of said predetermined axis and also include a second cam and a second cam follower which provide said second component of motion in said different direction transversely of said predetermined axis, wherein the first said cam follower is mounted on a lever which rotates about a fixed pivot and hence confines said first said cam follower for movement in a fixed path, wherein said second cam follower is mounted on a second lever which rotates about a fixed pivot and hence confines said second cam follower for movement in a fixed path, and wherein said fixed path for said first cam follower is generally radial of said first cam.

13. A machine as claimed in claim 1 wherein said further members include a cam and a cam follower which provide said component of motion in said one direction transversely of said predetermined axis and also include a second cam and a second cam follower which provide said second component of motion in said different direction transversely of said predetermined axis, wherein the first said cam follower is mounted on a lever which rotates about a fixed pivot and hence confines said first said cam follower for movement in a fixed path, wherein said second cam follower is mounted on a second lever which rotates about a fixed pivot and hence confines said second cam follower for movement in a fixed path, wherein said fixed path for said first cam follower is generally radial of said first cam, and wherein said fixed path for said second cam follower is generally radial of said second cam.

14. A machine as claimed in claim 1 wherein the first said members and said further members respond to said driving element to provide simultaneous rotation of said one support about said predetermined axis and movement of said other support transversely of said predetermined axis, and wherein said work-performing element is mounted on and moves with said other support and is a welding torch, whereby said welding torch can provide a continuous and uninterrupted weld of an angular extent which is substantially greater than said predetermined angle.

15. A machine as claimed in claim 1 wherein said work-performing element is mounted on and moves with said other support and is a welding torch, wherein said predetermined angle is between two hundred and forty degrees and three hundred and sixty degrees, and wherein the angular extent of said composite path followed by said other support adds to said predetermined angle to provide a continuous and uninterrupted weld of essentially three hundred and sixty degrees.

16. A machine that provides relative movement between a workpiece and a work-performing element and which comprises a support for said workpiece, a support for said work-performing element, a reversible driving element, members operated by said driving element to provide rotation of one of said supports in a given direction and then in the opposite direction about a predetermined axis, further members operated by said driving element to provide movement of the other of said supports transversely of said predetermined axis, said further members causing said other support to follow a path which is a composite of a component of motion in one direction transversely of said predetermined axis plus a second component of motion in a different direction transversely of said predetermined axis, the first said members coacting with said driving element to limit rotation of said one support to a predetermined angle of less than three hundred and sixty degrees about said predetermined axis while said work-performing element is performing work on said workpiece, said first said members thereafter coacting with said driving member to rotate said one support in the opposite direction about said predetermined axis, said further members responding to said driving element to move said other support in a predetermined direction through said composite path and thereby provide relative movement between said workpiece and said work-performing element which resembles relative movement that would be produced between said workpiece and said work-performing element if said first said members were able to coact with said driving element to rotate said one support a substantial angular distance beyond the end of said predetermined angle, whereby said rotation of said one support in said given direction by said first said members and said movement of said other support in said predetermined direction by said further members enables said work-performing element to perform work on said workpiece of an angular extent which is substantially greater than said predetermined angle, said work-performing element being a welding torch and being held by said other support, said other support and said welding torch are being translated during said movement of said other support in said one direction through at least a part of said composite path, said other support including a pivot which has the axis thereof parallel to said one direction transversely of said predetermined axis, and said welding torch being rotatable about said axis of said pivot, whereby said workpiece is rotatable about one of two orthogonally-displaced axes while said welding torch is translated in said different direction transversely of said predetermined direction and also is rotated about the other of said orthogonally-displaced axes.

17. A machine as claimed in claim 1 wherein said work-performing element is a welding torch and is held by said other support, wherein said other support is translated and also is rotated about two orthogonally-displaced axes, and wherein said driving element can translate said other support and simultaneously cause said other support to rotate about said orthogonally-disposed axes.

18. A machine as claimed in claim 1 wherein said further members include a supporting element which is translated to provide said component of motion in said one direction transversely of said predetermined axis and which is rotated to provide said second component of motion in said different direction transversely of said predetermined axis, and wherein said further members can provide simultaneous translation and rotation of said supporting element to provide the first said component of motion and said second component of motion simultaneously.

19. A machine that provides relative movement between a workpiece and a welding torch and which comprises a support for said workpiece, a support for said welding torch, a reversible driving element, members operated by said driving element to provide rotation of one of said supports in a given direction and then in the opposite direction about a predetermined axis, further members operated by said driving element to provide movement of the other of said supports transversely of said predetermined axis, said further members causing said other support to follow a path which is a composite of a component of motion in one direction transversely of said predetermined axis plus a second component of motion in a different direction transversely of said predetermined axis, the first said members coacting with said driving element to limit rotation of said one support to a predetermined angle of less than three hundred and sixty degrees about said predetermined axis while said welding torch is forming a weld on said workpiece, said first said members thereafter coacting with said driving member to rotate said one support in the opposite direction about said predetermined axis, said further members responding to said driving element to move said other support in a predetermined direction through said composite path and thereby provide relative movement between said workpiece and said welding torch which resembles relative movement that would be produced between said workpiece and said welding torch if said first said members were able to coact with said driving element to rotate said one support a substantial angular distance beyond the end of said predetermined angle, whereby said rotation of said one support in said given direction by said first said members and said movement of said other support in said predetermined direction by said further members enables said welding torch to form a weld on said workpiece of an angular extent which is substantially greater than said predetermined angle, said other support including a pivot which has the axis thereof parallel to said one direction transversely of said predetermined axis, said other support and said welding torch being movable in said one direction transversely of said predetermined axis while simultaneously being moved in said different direction transversely of said predetermined axis, said other support and said welding torch being rotatable about said axis of said pivot while said other support is moved in said predetermined direction through said composite path, whereby said welding torch is rotatable about an axis which is orthogonal to said predetermined axis while it is being moved transversely of said predetermined axis.

20. A machine as claimed in claim 1 wherein said further members include a cam and a cam follower, wherein said cam is mounted on a shaft and is rotatable, and wherein said cam follower moves generally radially of said shaft as said cam follower follows the "rises" and "falls" on said cam.

21. A machine as claimed in claim 1 wherein said further members include a supporting element which is translated to provide said component of motion in said one direction transversely of said predetermined axis and is rotated to provide said component of motion in said different direction transversely of said predetermined axis, wherein said further members include a cam follower, and wherein said cam follower is mounted on a lever that is held by a fixed pivot and that is moved as a result of translation of said supporting element.

22. A machine as claimed in claim 1 wherein said one support rotates in a predetermined direction about said predetermined axis while said other support is moved in a generally opposite direction through said composite path.

23. A machine as claimed in claim 1 wherein said predetermined angle does not exceed two hundred and seventy degrees and wherein the angular extent of said composite path followed by said other support is at least ninety degrees, and wherein said one support rotates in a predetermined direction about said predetermined axis while said other support is moved in a generally opposite direction through said composite path.

24. A method, of providing relative movement between a workpiece of a work-performing element to provide continuous work on said workpiece which has an angular extent substantially greater than the extent of actual movement of said workpiece, which comprises securing said workpiece to a support, securing said work-performing element to a support, causing a reversible driving element and first members operated thereby to provide rotation of one of said supports in a given direction about a predetermined axis and causing said driving element and further members operated thereby to provide movement of the other of said supports transversely of said predetermined axis through a path which is a composite of a component of motion in one direction transversely of said predetermined axis plus a second component of motion in a different direction transversely of said predetermined axis, causing said driving element and the first said members to rotate said one support in said given direction through a predetermined angle which has an extent that is substantially less than the desired angular extent of said continuous work while said work-performing element is performing work on said workpiece, causing said driving element and said further members to move said other support through said composite path while said work-performing element is performing work on said workpiece, and thereby provide relative movement between said workpiece and said work-performing element which resembles relative movement that would be produced between said workpiece and said work-performing element if said first said members were able to respond to said driving element to rotate said one support a substantial distance beyond the end of said predetermined angle, whereby work is continuously performed on said workpiece by said work-performing element throughout an angular extent of the surface of said workpiece which is substantially greater than the extent of said predetermined angle, and subsequently rotating said one support about said predetermined axis in a direction opposite to said given direction.

25. A method, of providing relative movement between a workpiece and a welding torch to provide a continuous and uninterrupted weld on said workpiece which has an angular extent substantially greater than the extent of actual movement of said workpiece, which comprises securing said workpiece to a support, securing said welding torch to a support, causing a reversible driving element and first members operated thereby to provide rotation of one of said supports in a given direction about a predetermined axis and causing said driving element and further members operated thereby to provide rotation of said welding torch about an axis which is transverse of said predetermined axis to provide desired torch angles while providing movement of the other of said supports transversely of said predetermined axis through a path which is a composite of a component of motion in one direction transversely of said predetermined axis plus a second component of motion in a different direction transversely of said predetermined axis, causing said driving element and the first said members to rotate said one support in said given direction through a predetermined angle which has an extent that is substantially less than the desired angular extent of said continuous and uninterrupted weld while said welding torch is forming said weld on said workpiece, causing said driving element and said further members to move said other support through said composite path while said welding torch is forming said weld on said workpiece, and thereby provide relative movement between said workpiece and said welding torch which resembles relative movement that would be produced between said workpiece and said welding torch if said first said members were able to respond to said driving element to rotate said one support a substantial distance beyond the end of said predetermined angle, whereby welding is continuously performed on said workpiece by said welding torch throughout an angular extent of the surface of said workpiece which is substantially greater than the extent of said predetermined angle, and subsequently rotating said one support about said predetermined axis in a direction opposite to said given direction.

26. A machine as claimed in claim 19 wherein said further members include a cam which is driven by said driving element and a cam follower which is moved by said cam, wherein said cam follower is movable by said cam to provide movement of said other support through at least a part of said composite path, wherein said further members include a further cam which is driven by said driving element and a further cam follower which is moved by said further cam, and wherein said further cam follower is movable by said cam to rotate said other support and said welding torch about said axis which is orthogonal to said predetermined axis while said other support is being moved through said part of said composite path by the first said cam and the first said cam follower.

* * * * *